United States Patent [19]
Suzuki

[11] Patent Number: 5,717,511
[45] Date of Patent: Feb. 10, 1998

[54] OPTICAL SCANNING SYSTEM

[75] Inventor: Seizo Suzuki, Yokohama, Japan

[73] Assignee: Ricoh Company, Ltd., Tokyo, Japan

[21] Appl. No.: 628,269

[22] Filed: Apr. 5, 1996

Related U.S. Application Data

[62] Division of Ser. No. 296,433, Aug. 26, 1994, Pat. No. 5,546,216.

[30] Foreign Application Priority Data

Aug. 26, 1993 [JP] Japan .................................. 5-211868

[51] Int. Cl.$^6$ .................................................. G02B 26/08
[52] U.S. Cl. ......................... 359/204; 359/216; 347/243
[58] Field of Search ........................... 359/212, 216–219, 359/204, 738–739; 250/234–236; 347/259–261, 243–244; 358/296, 474

[56] References Cited

U.S. PATENT DOCUMENTS

| | | | |
|---|---|---|---|
| 4,268,871 | 5/1981 | Kawamura | 358/298 |
| 4,474,422 | 10/1984 | Kitamura | 359/204 |
| 5,033,806 | 7/1991 | Tomita et al. | 359/207 |
| 5,161,047 | 11/1992 | Tomita et al. | 359/216 |
| 5,610,647 | 3/1997 | Takada | 359/216 |

*Primary Examiner*—James Phan
*Attorney, Agent, or Firm*—Oblon, Spivak, McClelland, Maier & Neustadt, P.C.

[57] ABSTRACT

An optical scanning system which converges light flux on a photoconductive member by an optical scanning lens after the light flux from a light source is coupled by a coupling lens (a condensing lens) and reflected by a polygonal mirror. The optical scanning system includes an area light emission source, the area light emission source and the photoconductive member being provided with geometrically-optically conjugate relations.

7 Claims, 4 Drawing Sheets

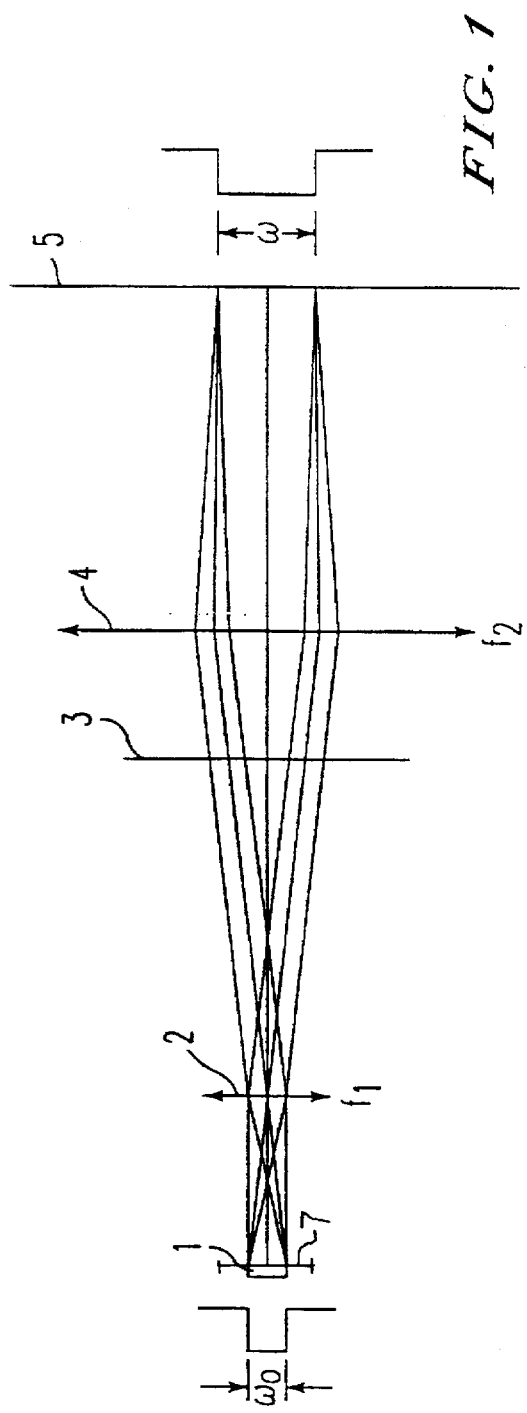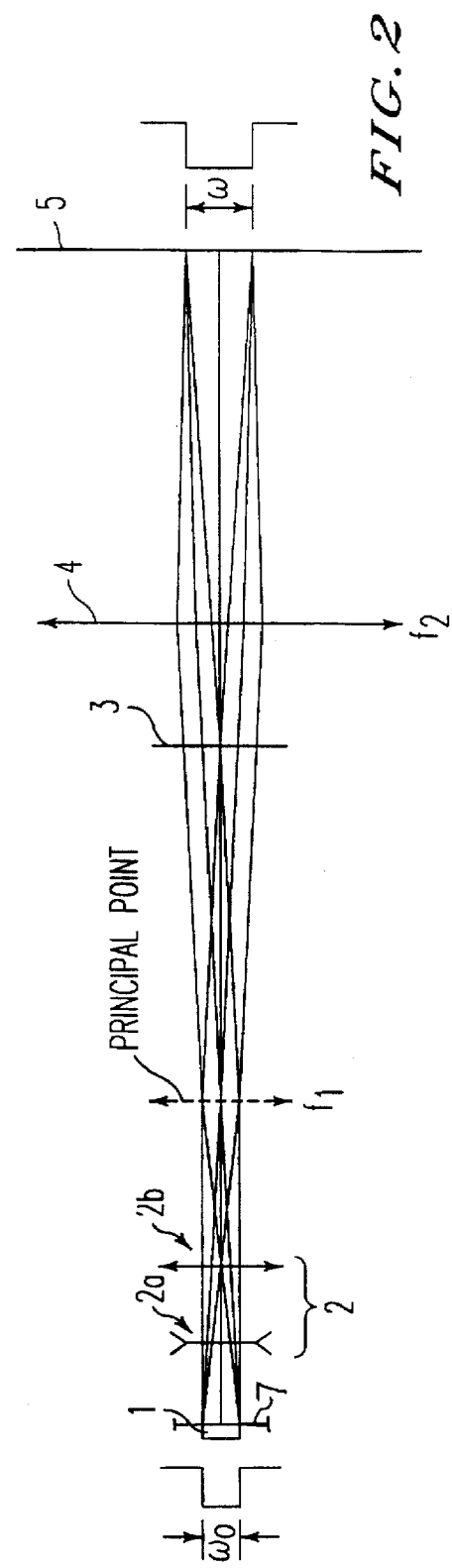

OPTICAL SCANNING SYSTEM

This is a Division of application Ser. No. 08/296,433, filed on Aug. 26, 1994, now U.S. Pat. No. 5,546,216.

BACKGROUND OF THE INVENTION

1. Field of the Invention

This invention relates to an optical scanning system which is provided on a digital copier, e.g., laser printer or laser facsimile etc.

2. Description of the Related Art

A digital copier, e.g., laser printer or laser facsimile etc., has an optical scanning system including a latent image writing member which converges light on a photoconductive member (a photoconductive drum). An optical scanning lens converges the light via a polygonal mirror after light from a light source is coupled by a coupling lens (or a condenser lens). In this application, the word "couple" is interchangeable with words like "collimate" and "condense" etc.

However, in the conventional optical scanning system, a beam spot on the photoconductive member generates a corresponding Gaussian intensity distribution. The reason is that, in the case where a semiconductor laser or a gas laser is used as a light source, light flux, which is diffused from the light source, includes the Gaussian intensity distribution and is focused (via an optical scanning system which has a relatively small aberration) on the photoconductive member. Therefore, the beam spot has the Gaussian intensity distribution at a focus position on the photoconductive member.

If a beam spot should include the Gaussian intensity distribution when the beam spot is scanned in the optical scanning system and a latent image is written on the photoconductive member, a size of the latent image changes because of a dispersion of a lighting output from the light source or light sensitivity characteristics. Therefore, the output becomes a blurred image. This problem is an especially difficult obstacle to overcome when a high density image is realized.

SUMMARY OF THE INVENTION

The present invention has as an object to overcome the above and other problems encountered in the aforementioned art.

It is a further object of the present invention to provide an optical scanning system capable of forming a rectangular intensity distribution of a beam spot which converges on a photoconductive member.

The above mentioned objects of the present invention are achieved by an optical scanning system which makes light flux convergent on a photoconductive member by an optical scanning lens after light flux from a light source is condensed by a coupling lens (a condenser lens) and reflected by a polygonal mirror. The optical scanning system includes an area light emission source, the light source and the photoconductive member being provided with geometrically-optically conjugate relations.

Namely, it is possible to make an intensity distribution of a beam spot rectangular on a photoconductive member.

When the intensity of a beam spot (which is made to be convergent on the photoconductive member) changes, the distribution changes. The changes of beam spot diameters of the Gaussian intensity distribution and a rectangular intensity distribution are shown in FIG. 5.

When a beam spot has a Gaussian intensity distribution as shown in FIG. 5, a diameter of a beam spot changes little, even if the dispersion of a lighting output from a light source or light sensitivity characteristics occurs. Therefore, the above mentioned problem does not occur.

In case of the Gaussian the intensity distribution as shown in FIG. 5, when the intensity distribution of a beam spot changes from a curve "a" to "b", a beam diameter ω' of intensity 0.135 in the curve "b" is shorter than a diameter ω of intensity in the curve "a". (The maximum intensity is 1.)

In the case of the rectangular intensity distribution, a diameter of a beam spot does not change even if the intensity of the beam spot changes from a curve "a" to "b".

Therefore, in the present invention, despite dispersion of lighting output from a light source or despite light sensitivity characteristics, it is possible to hold down changes of a beam spot diameter to a minimum.

BRIEF DESCRIPTION OF THE DRAWINGS

Other objects and further features of the present invention will become apparent from the following detailed description when read in conjunction with the accompanying drawings, wherein:

FIG. 1 is a diagram showing an optical scanning system according to first and second embodiments of the present invention;

FIG. 2 is a diagram showing an optical scanning system according to a third and a fifth embodiment of the present invention;

DESCRIPTION OF THE PREFERRED EMBODIMENT

First Embodiment

Figure 3:
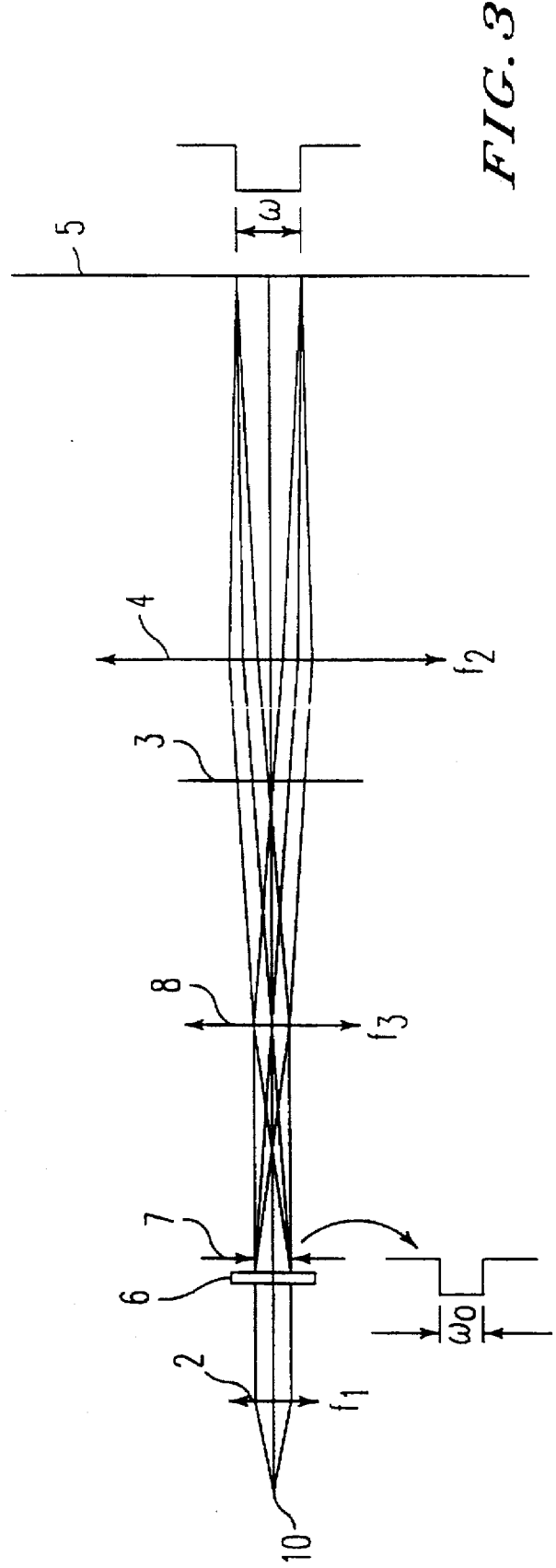
FIG. 3 is a diagram showing an optical scanning system according to a fourth embodiment of the present invention.

A description will now be given of the preferred embodiments according to the present invention.

FIG. 1 is a diagram showing an optical scanning system according to the present invention.

Light flux from a light source 1 is coupled by a coupling lens (a condenser lens) 2 and then is reflected on a surface of a polygonal mirror 3. The light reaches a photoconductive surface of a photoconductive member 5 via an optical scanning lens 4.

As shown in FIG. 1, in this optical scanning system, an element which lights from an area (such as an area light emission type of semiconductor laser or a laser alley etc.) is used as a light source 1.

At that time, the coupling lens 2 and the optical scanning lens 4 are provided so that the light source 1 and the photoconductive surface of the photoconductive member 5 have geometrically-optically conjugate relations.

Since the optical system is provided with almost geometrically-optically conjugate relations, a real image of the light source 1 is formed on the photoconductive member 5, as it is.

Since a light intensity distribution of a surface of the light emission portion is a rectangular shape, a beam spot on the photoconductive member 1 also shows an intensity distribution of a rectangular shape.

When the coupling lens 2 collimates a light, in case of a focal length f1 and a focal length of an optical scanning lens 4, a lateral magnification $\beta$, may be written as the following equation:

$$\beta = f2/f1 \quad (1)$$

And in case of a diameter of the light source $\omega 0$, a beam spot diameter $\omega$ is written as the following equation:

$$\omega = \beta * \omega 0 \quad (2)$$

Second Embodiment

Generally, in an optical scanning system, it is necessary to obtain any diameter of a beam spot in a main scanning or sub-scanning direction. (It is desired to change diameters of a beam spot in a main scanning or sub-scanning direction.)

Since, in the optical scanning system as shown in FIG. 1, a rectangular aperture 7 may be provided adjacent to the area light emission source 1 (such as an area light emission type of semiconductor laser). The aperture and the photoconductive member have geometrically-optically conjugate relations, and it is possible to obtain a beam spot of a rectangular shape for any diameter of a beam spot.

In this case, it is possible to attach a rectangular aperture to the light source 1. To form the aperture, a masking operation of a semiconductor laser making process may be employed.

Third Embodiment

FIG. 2 is a diagram showing an optical scanning system according to the present invention.

In the optical scanning system, as shown in equations (1) and (2), a diameter of a beam spot on the photoconductive member is determined necessarily on a ratio of f1 and f2. Accordingly, when a minute beam is needed, it is desired to make as small a value of lateral magnification of the equation (1) $\beta$ as possible.

This lateral magnification $\beta$ becomes smaller as the focal length of the coupling lens 2 becomes bigger. Since an optical path length between the coupling lens 2 and the light source 1 becomes longer when f1 is made to be bigger, it is difficult to miniaturize an optical system.

As shown in FIG. 2, the coupling lens 2 is made of a retro-focus system having a concave lens group 2a and convex lens group 2b, whereby a minute beam spot is obtained in a system in which a length of the light path is short. Therefore, a miniature optical system is provided with a rectangular beam spot.

Fourth Embodiment

FIG. 3 is a diagram showing an optical scanning system according to the present invention.

In this embodiment, after the coupling lens (the condenser lens) 2 couples light flux from light source 10 and the polygonal mirror 3 reflects the light flux, the optical scanning lens 4 makes the light flux convergent on the photoconductive member 5. A point light source such as a conventional semiconductor laser is used as a light source 10 in the optical scanning system. An area light source is generated by directing the light flux from the light source 10, via the coupling lens 2, to a diffusing board 6 (such as frosted glass). Then, a rectangular aperture 7 is provided adjacent to the diffusing board 6 and the aperture 7 and the photoconductive member 5 are disposed so as to have geometrically-optically conjugate relations, thereby a shape of the beam spot becomes substantially rectangular.

Namely, after the coupling lens 2 couples light flux from the light source 10, the light flux lights on the diffusing board 6 which is made of glass etc. However, when the rectangular aperture is provided adjacent to the diffusing board 6, the light flux from the aperture 7 has an almost rectangular intensity distribution. Since the optical scanning lens 4 is provided so that the aperture 7 and the photoconductive member 5 have almost geometrically-optically conjugate relations, a real image of the aperture 7 is formed on the photoconductive member 5 and intensity distribution of the beam spot is rectangular.

Fifth Embodiment

In the case where the diffusing board 6 and the aperture 7 are used, a quantity of light of the diffused light flux from the diffusion board 6 is lost until the diffused light flux reaches the optical scanning lens 4.

In this embodiment, as shown in FIG. 3, a relay lens 8 is provided between the diffusion board 6 and the optical scanning lens 4 to reduce a loss of quantity of the light.

Namely, since the optical scanning lens 4 and the relay lens 8 are provided so that the aperture 7 and the photoconductive member 5 again have almost geometrically-optically conjugate relations, a real image of the aperture 7 is formed on the photoconductive member 5 and the intensity distribution of a beam spot become rectangular.

When f3 represents focal length of the relay lens 8 and f2 represents focal length of the optical scanning lens 4, a lateral magnification of the optical scanning system $\beta$ may be written as the following equation:

$$\beta = f2/f3 \quad (3)$$

When $\omega 0$ represents a diameter of the aperture 7, a diameter of a beam spot on the photoconductive member 5 $\omega$ is written as the following equation:

$$\omega = \beta \times \omega 0 \quad (4)$$

Sixth Embodiment

Figure 4:
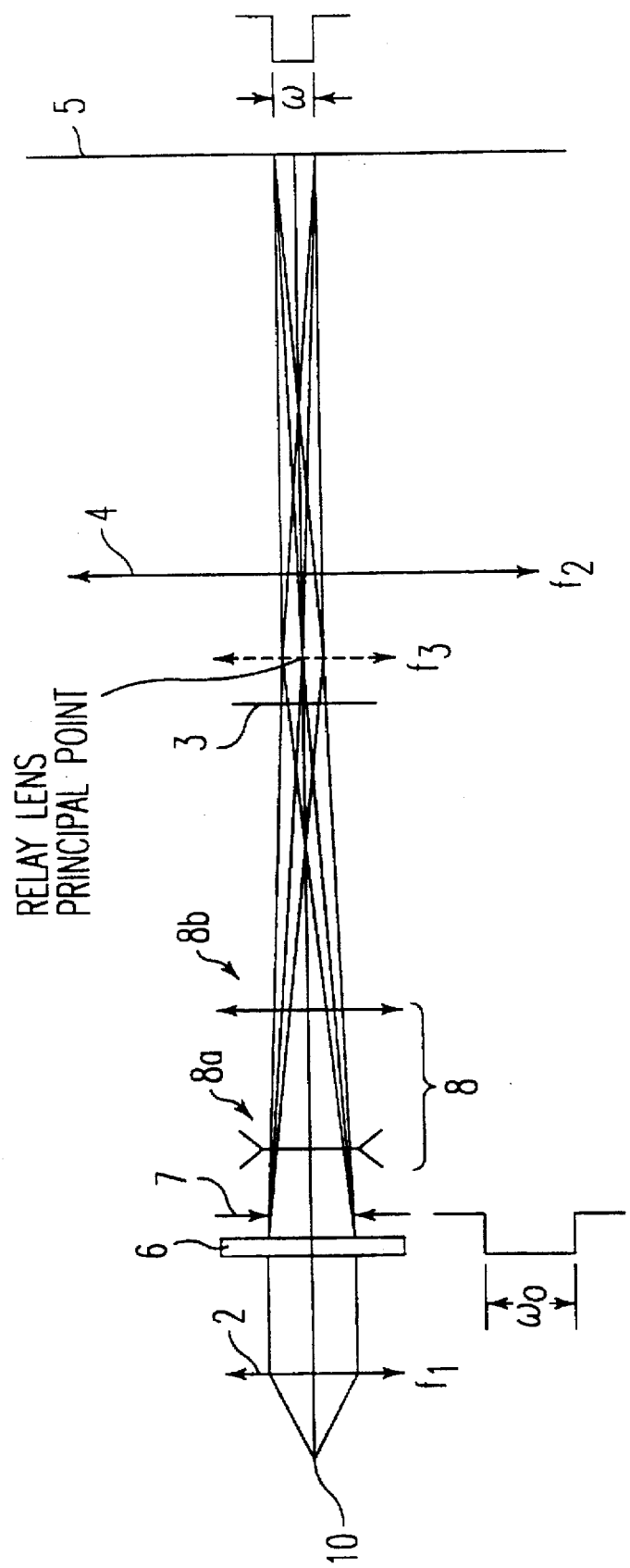
FIG. 4 is a diagram showing an optical scanning system according to a sixth embodiment of the present invention.
Figure 5:
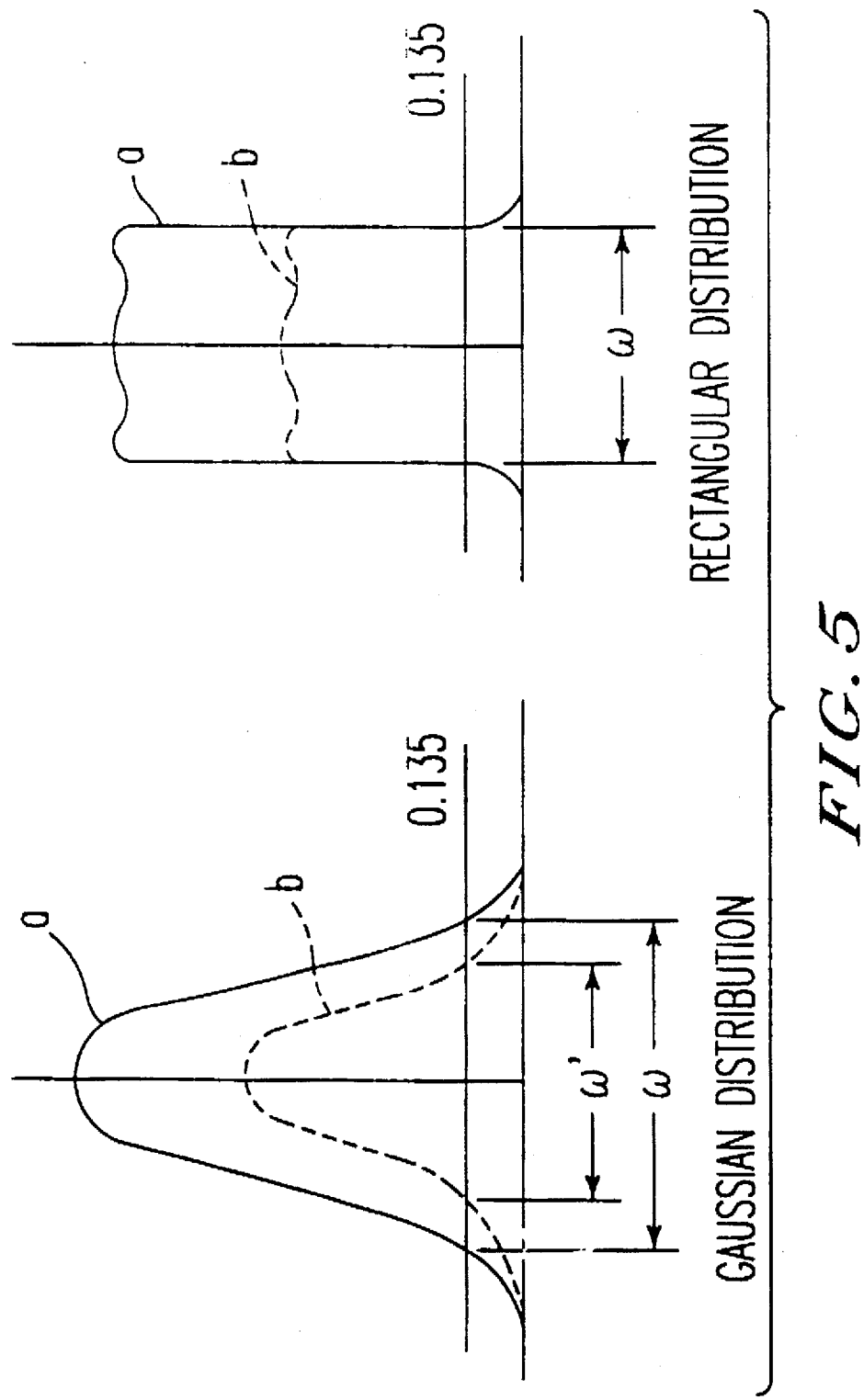
FIG. 5 is a diagram showing a change of a beam spot diameter of a Gaussian and a rectangular intensity distribution in case intensity of a beam spot which is made to be convergent on a photoconductive member.

FIG. 4 is a diagram showing an optical scanning system according to the present invention.

In the optical scanning system of FIG. 3, as shown in equations (3) and (4), a diameter of a beam spot on the photoconductive member 5 is determined according to a ratio of f3 and f2. It is desired to make a lateral length of the equation (3) short to obtain a minute beam spot. On the other hand, it is also desired to make as long a focal length f3 of the relay lens 8 as possible to make the lateral magnification $\beta$ small.

However, making the focal length f3 long causes an optical path length of the optical system to be long. Therefore, this arrangement is not suitable to miniaturize the system.

In this embodiment, as shown in FIG. 4, a retro-focus system comprising a concave lens group and a convex lens group is provided as a relay lens 8, whereby it is possible to make a lateral magnification small without making the light path length long, and to obtain a minute beam spot. Therefore, a miniature optical system may be obtained.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. An optical scanning system, comprising:
   an area light emission source which emits lights from an area;
   a coupling lens which couples light flux from said area light emission source; and
   an optical scanning lens which converges the light flux on a photoconductive member via a polygonal mirror after said coupling lens couples said light flux, wherein said area light emission source and said photoconductive member are provided with geometrically-optically conjugate relations to form a real image of the area light emission source on the photoconductive member; and
   an aperture provided near said light emission source, wherein said aperture and said photoconductive member are provided to have substantially geometrically-optically conjugate relations.

2. An optical scanning system according to claim 1, wherein said coupling lens further comprises:
   a retro-focus-system including a concave lens group and a convex lens group.

3. An optical scanning system, comprising:
   a area light emission source;
   a coupling lens which couples light flux from said area light emission source;
   an optical scanning lens which converges the light flux on a photoconductive member via a polygonal mirror after said coupling lens couples said light flux, wherein said area light emission source and said photoconductive member are provided with geometrically-optically conjugate relations to form a real image of the area light emission source on the photoconductive member; and
   a beam spot having a rectangular intensity distribution on the photoconductive member created by the optical scanning lens.

4. An optical scanning system according to claim 3, wherein said coupling lens further comprises:
   a retro-focus-system including a concave lens group and a convex lens group.

5. An optical scanning system comprising:
   a light emission source;
   a coupling lens which couples light flux from said light-emission source, said coupling lens including a concave lens group and a convex lens group;
   an optical scanning lens which converges the light flux on a photoconductive member via a polygonal mirror after said coupling lens couples said light flux, wherein said light emission source and said photoconductive member are provided with geometrically optically conjugate relations; and
   an aperture provided near said light emission source, wherein said aperture and said photoconductive member are provided to have substantially geometrically-optically conjugate relations.

6. An optical scanning system according to claim 5, further comprising:
   a beam spot having a rectangular intensity distribution on the photoconductive member created by the optical scanning lens.

7. An optical scanning system comprising:
   a light emission source;
   a coupling lens which couples light flux from said light emission source, said coupling lens including a concave lens group and a convex lens group;
   an optical scanning lens which converges the light flux on a photoconductive member via a polygonal mirror after said coupling lens couples said light flux, wherein said light emission source and said photoconductive member are provided with geometrically-optically optically conjugate relations; and
   a beam spot having a rectangular intensity distribution on the photoconductive member created by the optical scanning lens.

* * * * *